United States Patent [19]
Sommese et al.

[11] Patent Number: 5,573,675
[45] Date of Patent: Nov. 12, 1996

[54] CLARIFICATION OF DEINKING PROCESS WATERS USING POLYMERS CONTAINING VINYLAMINE

[75] Inventors: Anthony G. Sommese, Naperville; Karen R. Tubergen, Mt. Prospect, both of Ill.; Daniel K. Chung, Burlington, Canada

[73] Assignee: Nalco Chemical Company, Naperville, Ill.

[21] Appl. No.: 439,547

[22] Filed: May 11, 1995

[51] Int. Cl.⁶ ........................................................ C02F 1/56
[52] U.S. Cl. .............................. 210/705; 162/5; 210/727; 210/734; 210/735; 210/928
[58] Field of Search ........................ 162/5, 189; 210/705, 210/725, 727, 728, 734, 735, 917, 928

[56] References Cited

U.S. PATENT DOCUMENTS

| | | | |
|---|---|---|---|
| 5,013,456 | 5/1991 | St. John et al. | 210/734 |
| 5,269,942 | 12/1993 | Harrington et al. | 210/928 |
| 5,286,390 | 2/1994 | Gray et al. | 210/727 |
| 5,435,921 | 7/1995 | Collins et al. | 210/727 |
| 5,476,594 | 12/1995 | Collins et al. | 210/928 |

Primary Examiner—Peter A. Hruskoci
Attorney, Agent, or Firm—James J. Drake; Robert A. Miller; Patricia A. Charlier

[57] ABSTRACT

The invention relates to the clarification of deinking process waters which result from the recycling of paper. More specifically, the present invention relates to the use of containing vinylamine as water clarifying agents in said processes.

3 Claims, 1 Drawing Sheet

CLARIFICATION OF DEINKING PROCESS WATERS USING POLYMERS CONTAINING VINYLAMINE

BACKGROUND OF THE INVENTION

1. Field of the Invention

The invention relates to the clarification of deinking process waters which result from the recycling of paper. More specifically, the present invention relates to the use of copolymers containing vinylamine as water clarifying agents in said processes.

2. Description of the Prior Art

Recycled fiber has become an important element in the pulp and paper business. As the desire to recycle grows, the scope of materials recycled is likely to widen. New printing processes, both in the office and the press, are presenting new challenges for recyclers. Established mill recycling programs are working to keep pace with the new technologies, and for the most part have had a surprising amount of success. However, the water-based inks used in flexographic newspaper printing are proving difficult to handle, according to paper producers, who say an excess of the ink causes a reduction in brightness when passed through existing deinking systems.

One of the preliminary manufacturing steps in using recycled fibers for paper making consists of repulping the paper sources followed by removal of the printing ink from the fibers. Large volumes of water are required for the ink removal process and its clean-up is typically accomplished using a solids/liquid separation unit operation, such as Dissolved Air Flotation (DAF). Because recycle mills are most frequently located in metropolitan areas, a high degree of emphasis is placed on maintaining a closed water cycle in the mill. Effective clean-up of the DAF influent becomes important because any residual ink remaining in the water may be reintroduced to the fibers, resulting in a loss of brightness to the final sheet.

Clarification chemicals are typically used in conjunction with DAF units to remove the suspended solids from the deinking process waters. Often deinking process waters have a large anionic charge demand requiring the use of a dual polymer program for effective cleanup. A dual polymer treatment generally comprises a low molecular weight cationic coagulant in combination with a high molecular weight flocculant. Typical cationic coagulants are homo- and copolymers of diallyl dimethyl ammonium chloride, condensation polymers of ethylene dichloride-ammonia or dimethylamine-epichlorohydrin. Acrylamide-based flocculants are used to assist in the solid liquid separation. Both anionic and cationic flocculants can be employed.

SUMMARY OF THE INVENTION

The invention is a method for clarifying deinking process waters. The method consists of dosing the said ink laden water with a coagulant containing vinylamine followed by addition of a high molecular weight flocculant (anionic or cationic). Solid liquid separation is then effected using dissolved air flotation.

DETAILED DESCRIPTION OF THE PREFERRED EMBODIMENTS

Figure 1:
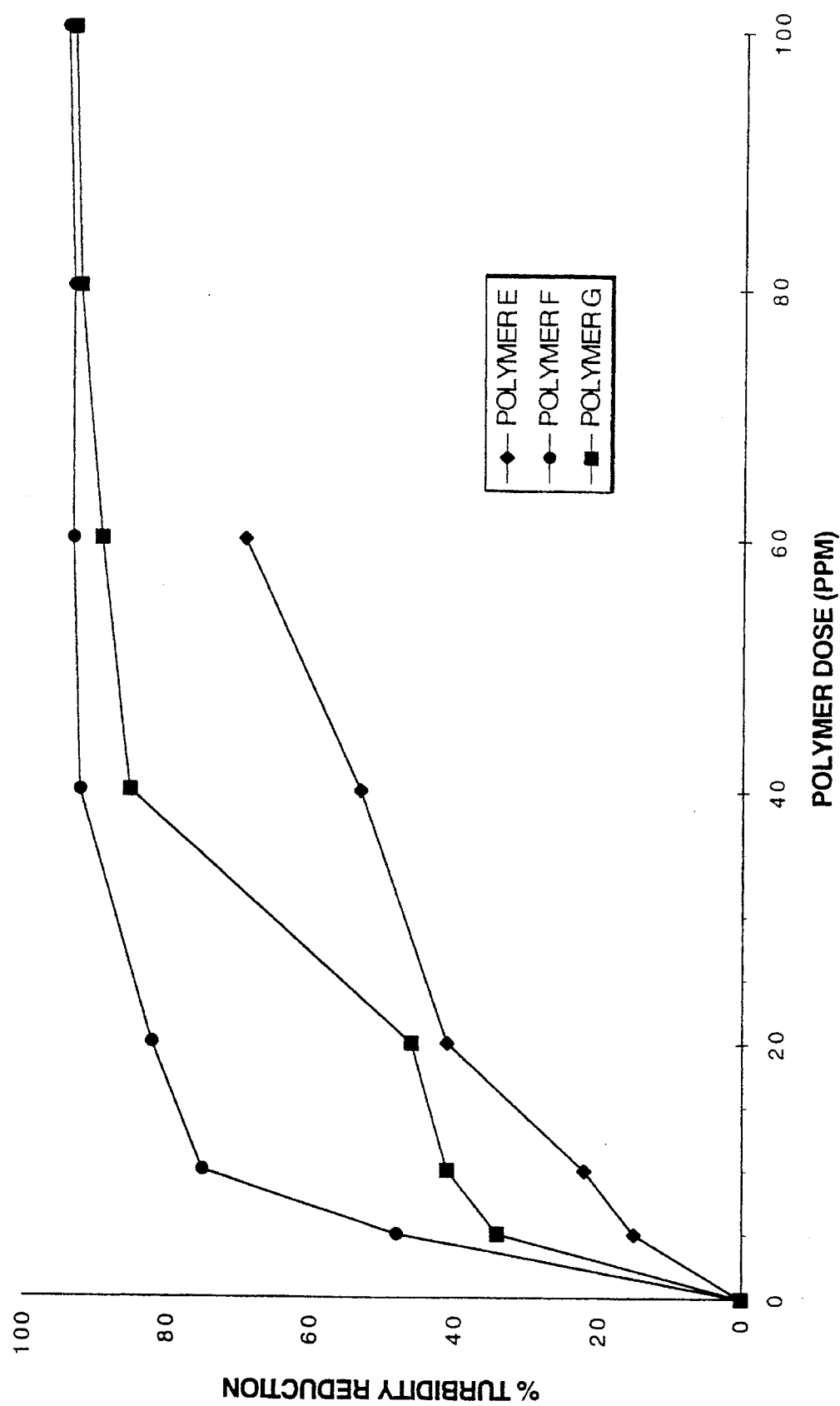
FIG. 1 is a graph of percent reduction in turbidity versus polymer dosage for a variety of coagulants at a constant 5 ppm anionic flocculant for a Southeastern papermill deinking substrate.

The present invention provides a method for the clarification of deinking effluent water. The method consists of addition of a coagulant polymer which contains vinylamine to the process water, followed by addition of a flocculant (either anionic or cationic). Solid liquid separation is then effected by dissolved air flotation (DAF). Typical cationic coagulants used in this application include the homo- and copolymers of diallyl dimethyl ammonium chloride (DADMAC), condensation polymers of ethylene dichloride-ammonia (EDC-NH$_3$) or dimethylamine-epichlorohydrin (EpiDMA). The vinylamine-containing polymers of the present invention have shown superior activity compared to these polymers. More importantly, the polymers of this invention exhibit favorable activity with both water-based (flexographic) and oil-based inks.

The invention comprises treating the deinking process waters with an effective amount of a water soluble polymer containing from about 1 to about 99 mole percent vinylamine monomer and/or a monomer hydrolyzable to vinylamine, and/or from 1–99 mole percent of amidine, vinylformamide, vinyl alcohol, vinyl acetate, vinyl pyrrolidinone, DADMAC or the esters, amides, nitriles and salts of acrylic acid and methacrylic acid monomer.

For purposes of this invention, vinylamine monomers include vinylamine and those monomers which are hydrolyzable to the following formula:

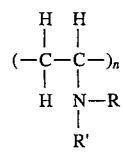

wherein: R and R' are, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

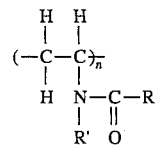

wherein: R and R' are, preferably, one substituent group selected from the group consisting of hydrogen and an alkyl group having from 1–10 carbon atoms. More preferably, R is hydrogen or is an alkyl group having 1–4 carbons.

The amidine moiety, derived from the amine hydrolysis of polyvinyl formamide has the following structure:

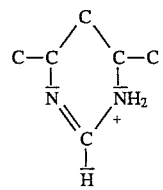

According to one embodiment of the invention, the polymers of the invention include a vinylamine/vinyl alcohol copolymer. Preferably, the copolymer will include from about 1 to about 99 mole % vinylamine and about 99 to about 1% vinylalcohol. More preferably, the copolymer will include from about 2 to about 50 mole % vinyl alcohol and from about 98 to about 50 mole % vinylamine. Most preferably, the vinyl alcohol is included in the copolymer in an amount of from about 95 to about 70 mole % and the vinylamine is included in an amount of from about 5 to about 30 mole %.

According to a further embodiment of the invention, the polymer composition includes vinylamine/vinylformamide copolymer. Preferably, the copolymer includes from about 1 to about 99% vinylamine and from about 1 to about 99% vinylformamide. More preferably, the copolymer includes from about 2 to about 50% vinylamine and from about 98 to about 50% vinylformamide. Most preferably the coagulants include 60–80% vinylamine and 40–20% vinylformamide.

According to a further embodiment of the invention, the polymer composition includes a vinylamine/vinylformamide/amidine terpolymer (A/B/C) in monomer ranges of: A 15–90%; B 5–60%; and C 5–60%. Most preferably the monomer range is about 65/5/30, respectfully.

Processes for making the polymers of the invention are well known in the art. U.S. Pat. Nos. 5,126,395; 5,037,927; 4,952,656; 4,921,621; 4,880,497; 4,441,602 and 5,324,792 the disclosures of which are incorporated herein by reference, all describe methods for preparing the polymers of the invention. Solution polymerization produces the desired molecular weight range. The resulting vinylformamide homopolymers are susceptible to alkaline or acid hydrolysis which converts some or all of the amide groups to amine groups. These U.S. patents all describe methods for preparing the polymers of the invention. By controlling the stoichiometry of the hydrolyzing agent it is possible to produce vinylamine/vinylformamide copolymers of varying composition. If vinylformamide is polymerized with other ethylenically unsaturated monomers, then hydrolyzed, it is conceivable that the polymer produced will contain at least three and possibly more functional groups. Cyclic amidine is produced by ammonia or amine hydrolysis of polyvinylformamide.

Preferably, the vinylamine polymers of the invention have an average molecular weight of from about 10,000 to 3,000,000. More preferably, the molecular weight is from about 250K to about 3 million. Vinylamine polymers having molecular weights of from about 500K to 3 million are the most preferred in treatments performed in accordance with this invention.

Generally, the dosage, based on active polymer, will be from about 0.01 to about 300 ppm by weight of the deinking water treated. More preferably, the dosage range is between 0.10 to about 100 ppm; and most preferably, from about 1 to about 50 ppm.

In an embodiment, the method of the present invention includes the further step of adding an effective amount of a flocculant to the coagulated ink particles. The flocculant component of the present invention leads to the direct agglomeration of the colloidal solids, enhances floc formation and promotes co-precipitation of dissolved solids onto the suspended solids template. Examples of suitable flocculants that may be used in the present invention include: i.e. copolymers of acrylamide and the esters, amides and salts of acrylic acid or polyacrylic acid. While the sole addition of the amine-containing polymer effectively coagulates the ink particles, the combined addition of a flocculant is preferred. In an embodiment, the flocculant component of the present invention is added in an effective amount of from 0.01 to 50 ppm.

The optimal amounts of the various components required for effectiveness in this invention depend on the type of inks present in the process waters. For the most part, recycled papers are printed with hydrophobic, oil-based letterpress or offset inks. These printing inks consist of high viscosity mineral oils, carbon black, specialty additives, and colophonium derivatives and/or alkyd resins as binders. A growing percentage of materials are, however, being primed with water-based (flexographic) inks. Flexographic inks utilize acrylic resins as their binders. As such, these resins become soluble under typical deinking operations and behave quite differently from the conventional oil-based inks during the recycling process. This poses a significant problem for water clarification treatments. In addition, the concentration of the combined components varies greatly and can depend upon the conditions such as temperature, pH and the amount of suspended solids.

The polymers of the invention are preferably added to the system in solution form prior to the DAF unit. The results for each set of testing are discussed individually below in respective examples. Polymers used in this study are displayed in TABLE I. The chemical treating agents were added at the listed dosages. All Nalco designated products are available from Nalco Chemical Company, Naperville, Ill. Vinylamine/Vinylalcohol copolymers were received from Air Products & Chemicals.

TABLE I

| POLYMER | COMPOSITION |
| --- | --- |
| A | Polyvinylamine, 100–300K |
| B | 70:30 vinylamine/vinylformamide 100–300K |
| C | 80:20 vinylamine/acrylic acid 500K–1M |
| D | 50:50 vinylamine/vinylpyrrolidone 800K–2M |
| E | 90:10 DADMAC/acrylic acid 400–800K |
| F | 12:88 vinylamine/vinylalcohol 40–200K |
| G | 06:94 vinylamine/vinylalcohol 40–200K |
| H | commercial DADMAC |
| I | EPI/DMA, crosslinked |
| J | polyvinylamine, 300–500K |
| K | 15:85 vinylamine/vinylalcohol 100–300K |
| L | EPI/DMA, linear |
| M | 70:30 vinylamine/DADMAC 500–800K |

The following examples are presented to describe preferred embodiments and utilities of the invention and are not meant to limit the invention unless otherwise stated in the claims appended hereto.

EXAMPLES

The samples tested were taken from a variety of paper mill locations throughout North America or were synthetically prepared in the laboratory. Mill samples included process waters from recycled furnishes of newsprint/magazine, coated book/mixed office waste, oil- and water-based inked newsprint and were taken from the DAF section of the system. Synthetic samples were prepared by repulping blends of oil-based and water-based printed newspapers using typical mill deinking conditions. The pulper slurry was mechanically extracted, the water was collected and diluted three-fold prior to polymer evaluation.

Deinking process water samples of 250 mL were used for testing. The jar test mixing and polymer addition conditions are given in TABLE II. The general dosage of the polymers is between 0.5–100 ppm. It is understood that routine experimentation for any particular case is necessary to ascertain the optimum dosage.

TABLE II

JAR TEST TIMING SEQUENCE

| | |
|---|---|
| SEQUENCE | 1. 3 min rapid mix (200 rpm) |
| | 2. 2 min slow mix (25 rpm) |
| | 3. 5 min settling period |
| | 4. Remove supernatant sample and measure turbidity |
| POLYMER ADDITION | 1. Coagulant added at beginning of rapid mix |
| | 2. Flocculant added at tend of rapid mix last 40 sec |

Polymer activity was evaluated by graphing percent turbidity reduction as a function of polymer dose.

In all these tests it should be noted that the samples were finally treated with 1.0–5.0 ppm of a polymeric flocculant which was a commercial acrylamide, sodium acrylate flocculant commonly used in the treatment of ink laden recycled paper process waters.

Example 1

Southeastern Newsprint Recycle Mill. The current dual polymer program at this mill utilizes POLYMER E as the coagulant. A variety of amine containing polymers were tested and found to reduce initial turbidity levels up to about 60% (TABLE III).

TABLE III

VINYLAMINE SCREENING

| | % Turbidity Reduction | | | |
|---|---|---|---|---|
| Dose (ppm) | Polymer A | Polymer B | Polymer C | Polymer D |
| 60 | 21 | 24 | 31 | 48 |
| 80 | 24 | 28 | 38 | 55 |
| 100 | 35 | 48 | 40 | 52 |

However, the most effective treatment for this influent are copolymers of vinylamine/vinylalcohol, POLYMERS F and G. The activity of these polymers is shown in FIG. 1 and reveals higher efficiency and effectiveness than the polyampholyte currently in use.

Example 2

Canadian Tissue Recycle Mill. Two samples were examined with slightly different furnish compositions. TABLE IV examines a DAF influent generated from an 88/12 coated book/office waste source. The vinylamine/vinylalcohol copolymers, POLYMERS F and G, were more effective in reducing the turbidity than the current program, POLYMER H. Results in TABLE V are derived from testing of a 82/18 coated book/office waste. Once again, a vinylamine/vinylalcohol copolymer, POLYMER F, performed better than POLYMER H and equally as well as a polyampholyte copolymer, POLYMER E.

TABLE IV

CANADIAN TISSUE RECYCLE MILL
(88% Coated Book/12% Mixed Office Waste)

| | % Turbidity Reduction | | |
|---|---|---|---|
| Dose (ppm) | Polymer H | Polymer F | Polymer G |
| 1.0 | | 14 | |
| 1.5 | | 31 | 13 |
| 2.0 | | 37 | 16 |
| 2.5 | | 46 | 28 |
| 3.0 | | 56 | 50 |

TABLE IV-continued

CANADIAN TISSUE RECYCLE MILL
(88% Coated Book/12% Mixed Office Waste)

| | % Turbidity Reduction | | |
|---|---|---|---|
| Dose (ppm) | Polymer H | Polymer F | Polymer G |
| 3.5 | | 62 | |
| 4.0 | | 68 | |
| 4.5 | 36 | | |
| 6.0 | 52 | | |

TABLE V

CANADIAN TISSUE RECYCLE MILL
(82% Coated Book/18% Mixed Office Waste)

| | % Turbidity Reduction | | |
|---|---|---|---|
| Dose (ppm) | Polymer H | Polymer E | Polymer F |
| 1.0 | | | 58 |
| 1.5 | | | 61 |
| 2.0 | | 66 | 66 |
| 2.5 | | | |
| 3.0 | 62 | 71 | 70 |
| 3.5 | | | |
| 4.0 | | 77 | |
| 4.5 | 66 | | |
| 6.0 | 68 | | |

Example 3

Canadian Newsprint Recycle Mill. Clarification of DAF influents which contain flexographic inks (water-based) have proven to be a challenge. TABLE VI depicts the use of vinylamine homo- and co-polymers, POLYMERS J, K, and F, for a DAF influent originating from a fiber source containing 10% flexographically printed newspapers. All of the polymers shown were effective in reducing turbidity levels to a desirable value and approached the activity of POLYMER I.

TABLE VI

CANADIAN NEWSPRINT RECYCLE MILL
(10% Flexographic/90% Offset Newsprint)

| | % Turbidity Reduction | | | |
|---|---|---|---|---|
| Dose (ppm) | Polymer I | Polymer J | Polymer K | Polymer F |
| 0.25 | | 76 | | 80 |
| 0.50 | | | | 83 |
| 0.75 | | 77 | | 85 |
| 1.00 | | | | 87 |
| 1.25 | | 78 | 82 | 87 |
| 2.00 | 90 | | | |
| 2.50 | | | 86 | |
| 3.00 | 91 | | | |
| 4.00 | 90 | | | |
| 5.00 | 89 | 82 | 87 | 86 |
| 10.00 | | 80 | 88 | |

Example 4

Synthetic DAF influents were prepared in the laboratory using blends of flexographic and offset printed newspapers as the fiber source. TABLE VII shows the results of coagulant screening with water obtained from the repulping of 100% flexo-based newsprint. POLYMER M performed as well as POLYMER L while POLYMER J and POLYMER F were less efficient.

Influent waters obtained from blends of flexo- and oil-based repulped newspapers are shown in TABLES VIII and IX. For each water sample, POLYMER L, POLYMER E, and POLYMER F, were examined for their clarifying abilities. Although POLYMER F displayed effectiveness, the data indicates that POLYMER L would be the polymer of choice based on efficiency. POLYMER E was effective to a very limited extent as it readily redispersed the system.

TABLE VII

100% Flexographic Newsprint

% Turbidity Reduction

| Dose (ppm) | Polymer L | Polymer F | Polymer M | Polymer J |
|---|---|---|---|---|
| 10 | 65 | 60 | 63 | 64 |
| 20 | 97 | 85 | 95 | 63 |
| 40 | 96 | 95 | 97 | 97 |

TABLE VIII

50% Flexographic/50% Offset Newsprint

% Turbidity Reduction

| Dose (ppm) | Polymer L | Polymer E | Polymer F |
|---|---|---|---|
| 5 | 9 | 7 | 19 |
| 10 | 79 | 64 | 28 |
| 20 | 97 | 96 | 86 |
| 40 | 91 | 20 | 86 |
| 60 | 91 | 8 | 64 |

TABLE IX

25% Flexographic/75% Offset Newsprint

% Turbidity Reduction

| Dose (ppm) | Polymer L | Polymer E | Polymer F |
|---|---|---|---|
| 10 | 79 | 72 | 31 |
| 20 | 88 | 90 | 85 |
| 40 | 82 | 0 | 87 |
| 60 | 67 | 0 | 72 |

Changes can be made in the composition, operation and arrangement of the method of the present invention described herein without departing from the concept and scope of the invention as defined in the following claims:

We claim:

1. A method for clarifying recycled paper deinking effluent containing flexographic ink, comprising 1) adding to the effluent with a polymer coagulant containing vinylamine in an amount of from about 0.01 to about 300 parts per million to produce a coagulated effluent, said polymer coagulant being selected from the group consisting of a copolymer of about 5 to 30% by weight of vinylamine and from about 95 to 70% by weight vinylalcohol having an average molecular weight of about 40,000 to 3,000,000, a polyvinylamine homopolymer having an average molecular weight of about 300,000 to 3,000,000, and a copolymer of 70% by weight vinylamine and 30% by weight diallyl dimethyl ammonium chloride having an average molecular weight of about 500,000 to 3,000,000;

2) adding to the coagulated effluent a high molecular weight acrylamide flocculant having a molecular weight of from about 3 million to about 20 million daltons in an amount of from about 0.01 to 50 parts per million; and 3) effecting solid-liquid separation, wherein the solid-liquid separation is carried out by dissolved air flotation.

2. The method of claim 1, wherein the vinylamine containing polymer is the copolymer of vinylamine and vinylalcohol.

3. The method of claim 1, wherein the vinylamine polymer is the polymer of vinylamine and diallyl dimethyl ammonium chloride.

\* \* \* \* \*

UNITED STATES PATENT AND TRADEMARK OFFICE
CERTIFICATE OF CORRECTION

PATENT NO. : 5,573,675
DATED : NOVEMBER 12, 1996
INVENTOR(S) : ANTHONY G. SOMMESE, ET AL

It is certified that error appears in the above-indentified patent and that said Letters Patent is hereby corrected as shown below:

COLUMN 8, CLAIM 3 mer is the <u>polymer</u> of vinylamine and diallyl dimethyl

LETTERS PATENT SHOULD READ AS:

mer is the <u>copolymer</u> of vinylamine and diallyl dimethyl

Signed and Sealed this

Fourteenth Day of January, 1997

Attest:

BRUCE LEHMAN

*Attesting Officer*     *Commissioner of Patents and Trademarks*